(12) United States Patent
Stahl

(10) Patent No.: US 7,346,402 B1
(45) Date of Patent: Mar. 18, 2008

(54) TECHNIQUE FOR AN INTEGRATED AND AUTOMATED MODEL GENERATION AND CONTROLLER TUNING PROCESS

(75) Inventor: Helmuth Stahl, Herrsching (DE)

(73) Assignee: ExpertControl, LLC, Pinckney, MI (US)

( * ) Notice: Subject to any disclaimer, the term of this patent is extended or adjusted under 35 U.S.C. 154(b) by 137 days.

(21) Appl. No.: 10/971,605

(22) Filed: Oct. 22, 2004

(51) Int. Cl.
*G05B 13/02* (2006.01)

(52) U.S. Cl. ............... 700/37; 700/28; 700/29; 700/30; 700/31; 700/53

(58) Field of Classification Search ........... 700/28–31, 700/37, 53
See application file for complete search history.

(56) References Cited

U.S. PATENT DOCUMENTS

| | | | |
|---|---|---|---|
| 6,826,521 B1 * | 11/2004 | Hess et al. | 703/12 |
| 2003/0078684 A1 * | 4/2003 | Martin et al. | 700/44 |
| 2003/0139825 A1 * | 7/2003 | Lund | 700/29 |

* cited by examiner

*Primary Examiner*—Ronald Hartman, Jr.
(74) *Attorney, Agent, or Firm*—BainwoodHuang

(57) ABSTRACT

A method, apparatus and computer program product for performing integrated model generation and controller tuning is presented. The method, apparatus, and computer program product acquires data regarding the system. The data is then analyzed and preprocessed to provide modified data, and a model is generating from this modified data. A controller design is determined from the modified data and the model, and controller parameters are calculated from the modified data and the model.

22 Claims, 4 Drawing Sheets

TECHNIQUE FOR AN INTEGRATED AND AUTOMATED MODEL GENERATION AND CONTROLLER TUNING PROCESS

BACKGROUND

Industrial products (e.g., cars, airplanes, hard disk drives, power plants and robots) are produced containing an increasing number of control loops and controllers. Control loops and their associated controllers are designed to eliminate the need for continuous operator attention. Cruise control in a car and a house thermostat are common examples of how control loops and associated controllers are used to automatically adjust some variable to hold the measurement (or process variable) at a pre-defined set point. Due to the flexibility of software, controllers for industrial products are increasingly realized in software rather than in hardware. To gain optimal dynamic behavior of these industrial products, a measurement and model-based development approach is applied. In this context, the term "model based" means that mathematical equations are built and used for various tasks including analysis, visualization and simulation in real-time and/or non-real-time applications.

Controllers based on these models are designed to improve the overall closed-loop system dynamics. In some instances, products are manufactured "even on purpose" with some dynamic deficiencies to reduce development and production costs. However, to overcome the deficiencies, controllers are used which may be developed in a more cost effective way.

Before these products are marketed, they are typically tested in test environments according to prescribed procedures and test conditions. To make sure that the test conditions are met as close as possible, further control loops may also be designed and realized in test automation systems.

SUMMARY

Conventional mechanisms such as those explained above suffer from a variety of drawbacks. One such drawback is that conventional modeling and control design, taken as separate tasks, are difficult processes because of the complex underlying theories, while combining modeling and control design and automating them is even more complex. For broader applicability in technical products and to improve existing systems, easy-to-apply procedures are needed.

Embodiments of the invention significantly overcome such drawbacks and provide mechanisms and techniques that provide integrated model generation and controller tuning.

The technique for an integrated and automated model generation and controller tuning process provides a procedure to progress from measurements of time dependent physical quantities to optimized controllers in an automated manner. In a particular embodiment, the technique includes the steps of (a) acquiring data (b) analyzing and pre-processing this data, (c) building mathematical models using the results from a) and b), and (d) calculating controller parameters from the information gained by the previous steps. The modeling step c) is often called system identification and may be considered as an intermediate step in the entire process of calculating optimized parameter sets for controllers. The modeling step may also be used independently and for other purposes including analysis, visualization, and simulation in real-time or non-real-time applications.

The present method of performing integrated model generation and controller tuning further includes a level of synergy between the different steps to process information which is not available in conventional mechanisms. Different information and criteria are checked and cross-checked at different stages of the process. In the present method of performing integrated model generation and controller tuning, user information and/or requirements are converted into criteria which are processed. The steps benefit from results of previous steps such that this information is not lost between steps and is taken into account as necessary.

Still other embodiments include a computerized device, configured to process all the method operations disclosed herein as embodiments of the invention. In such embodiments, the computerized device includes a memory system, a processor, a communications interface and an interconnection mechanism connecting these components. The memory system is encoded with a process that provides integrated model generation and controller tuning as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing integrated model generation and controller tuning as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Before describing particular embodiments of the invention, it may be helpful to describe some of the terminology used throughout the description.

Technique is defined as the methodology described herein with respect to the integrated and automated model generation and controller tuning process.

System refers to the plant, process, object, car, airplane, technical system, component, closed loop system, open loop system etc. for which the model generation and controller tuning are being developed.

Controller is defined as the algorithm providing outputs based on inputs and parameters to modify the dynamic behavior of a system.

Model is defined as the mathematical equation(s) from measured or simulated data or built analytically from known physics, e.g. based on from equilibrium conditions. These equations may be static or dynamic equations, discrete-time or continuous-time equations, Single Input/Single Output (SISO) equations, Multiple Input/Multiple Output (MIMO) equations, linear or non-linear equations (time varying is considered to be non-linear). When differential equations are involved, their type may be ordinary or partial of different orders.

Model Generation refers to building models from measured, simulated or prescribed data. When measured data is used, this methodology is also called system identification.

Application Domain is the environment associated with the system. The application domain, for example, could be one of mechanics, electronics, hydraulics, pneumatics, magnetics, chemical, thermodynamics, or combinations thereof. Industry segments such as automotive, aerospace, process, pharmaceutical, medical, refinery, machinery, mining and the like may also be considered as application domains.

Physical Data/Quantity refers to characteristic data known in the various application domains described above. Examples of these include position, speed, acceleration, force, torque, pressure, temperature, current, voltage, and the like.

Signal/Acquired Data is the measured or simulated Physical Data/Quantity.

Easy-to-use/Easy-to-apply describes the fact that the technique may be used/applied even without expert knowledge in various technical domains involved.

Figure 1:
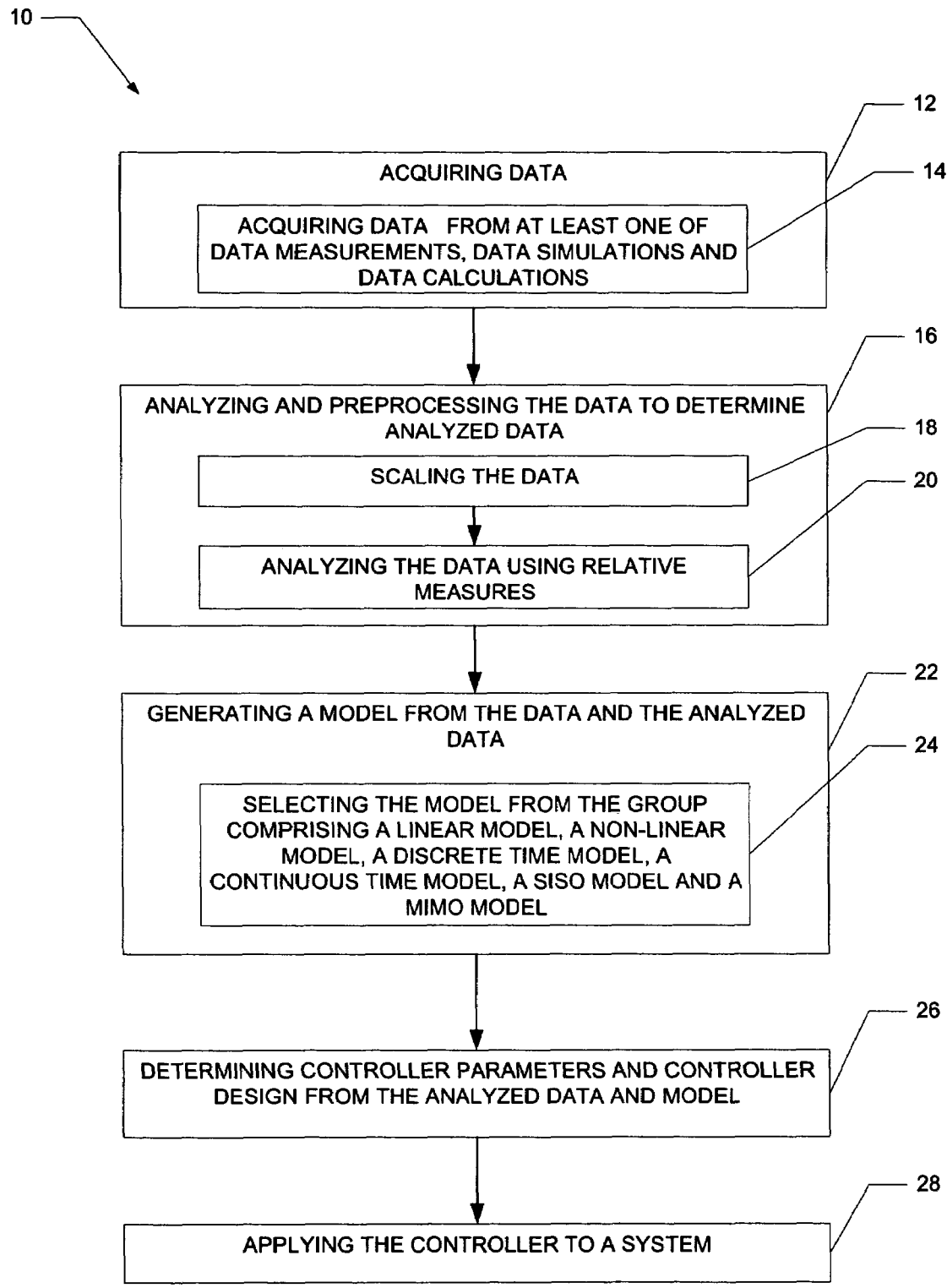
FIG. 1 is a flow diagram of a particular embodiment of an integrated and automated model generation and controller tuning process.

A flow chart of a particular embodiment the presently disclosed method of integrated and automated model generation and controller tuning is depicted in FIG. 1. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present method of performing integrated model generation and controller tuning. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 1, a particular embodiment of a method 10 for performing integrated model generation and controller tuning is shown. The methodology for performing integrated model generation and controller tuning in a particular embodiment includes several steps and further includes a level of synergy between the different steps to process information which is not available in conventional mechanisms. Different information and criteria are checked and cross-checked at different stages of the process. In the present invention, user information and/or requirements are converted into criteria which are processed. The steps benefit from results of previous steps such that this information is not lost between steps and is taken into account as necessary.

The method 10 begins at processing block 12, wherein data is acquired for the system. In a particular embodiment, specific hardware is used to acquire measured data of physical quantities over time from real systems.

In processing block 14, this data is preferably available in computer readable form such as files, computer memory or other appropriate media located in one computer (or attached to it) or distributed in a computer network including the Internet. The data may also be acquired from a model available within a simulation environment or from any device capable of determining results from formulas.

In processing block 16, the data is analyzed and preprocessed to determine modified data. Analyzing the acquired data includes gaining information about the data quality, noise, type of system excitation (e.g., one or more inputs) and reaction of the system (e.g., one or more outputs). Depending upon the model chosen, differences in the system dynamics with respect to operating points may be analyzed as well. From the data available, portions of the data are extracted which have been found to fit best for model structure and parametrization. The determination regarding which portions of the data are extracted may include comparisons of different data sequences and ranking of the data sequences with respect to measurements such as noise and dynamics. When linear models are utilized, linearity tests are applied on the acquired data as well. In addition, if multiple operating points are to be considered, this procedure is applied to all of the operating points.

In certain scenarios, for example due to limited precision of calculations in computers, scaling is used to obtain numerical independence, as recited in processing block 18. Numerical independence may be achieved by pre-processing all numbers with respect to magnitude and time. This procedure is also referred to as amplitude scaling and time scaling. Both amplitude scaling and time scaling are useful for ensuring that numerical problems arising in the subsequent steps from small numbers (e.g., $10^{-6}$ and smaller) and from large numbers (e.g., $10^{+6}$ and larger) are avoided.

In processing block 20, the data is analyzed using relative measures. An important aspect in signal classification with respect to type and quality is to work with relative quantities rather than with absolute quantities wherever possible. When this requirement is met, the technique in general and also intermediate steps is applicable to provide the desired results and are independent from the particular values of the acquired data.

The following example illustrates the preferred use of relative measurements. In this example, measured positions may be available in a first scenario in mm (2.7 mm, 2.9 mm, 2.8 mm, etc.). In the pre-processing, the technique will calculate automatically whether the deviations from the mean value 2.8 are relevant or not. Absolute deviations in this example are −0.1, 0.1 and 0. The relative deviation values are calculated by dividing by the mean value 2.8. They are −3.57%, +3.57% and 0%. In a second scenario, the same positions are measured in meters instead of mm (0.0027 m, 0.0029 m, 0.0028 m, etc). Here, the absolute deviations are −0.0001, 0.0001 and 0, and the relative values are same as in the first scenario. Thus, taking relative values yields the same values and may consequently be used independent from the actual physical numbers. Therefore, in a situation where decisions are made based on this relative measure, the decision remains the same regardless of the magnitude of the measurements.

Noise is usually part of acquired data and may be analyzed by standard statistical methods. For instance, calculating the variance between the signal and a low pass filtered version of the signal gives an indication regarding the noise level of the signal.

Checking the dynamics of the acquired data is used to provide modeling algorithms information in addition to the acquired data. Depending on the algorithm used, all or just a portion of this information may be useful. This information includes knowledge about where the signals are in steady-state mode and where signal transitions occur. Information about dynamics contained in the signals is relevant, as sufficient dynamics are needed to cover a broad frequency range. This signal bandwidth determines the applicability of the acquired data for a specific purpose and the validity area of models and controllers calculated in subsequent steps.

When linear dynamic models are utilized, the acquired data should meet some basic criteria with respect to linearity. In a particular example, in order to obtain an indication about whether a system is generally linear, the following operations are performed. The first operation involves placing the system at an operating point. Next, a step wise change (designated change value CH) is applied to the system input and the system reaction is recorded at the relevant output. CH should be chosen suitably to the operating point and the system's non-linear effects. The previous operation is repeated with CH/2, CH*2, −CH, −CH/2 and −CH*2. The system output is then normalized with respect to these input changes and deviations are calculated. If the deviations are sufficiently small with respect to a predefined relative measure, the system may be considered to be generally linear. From a visualization perspective, this comparison can also be shown graphically by plotting the corresponding curves for the results from the application of the different change values to the system.

In processing block 22, a model is generated from the modified data of processing block 12. The goal is to gain the model structure and the parametrization. When multiple operating points are of interest, the model structure and the parametrization are aimed to be valid for all operating points. Based on the acquired data pre-processed according to the processing block 14 (referred to as modified data), different methods and algorithms already available may be applied. With respect to the technique and because of the automation process involved, those methods and algorithms are preferred which aren't required to know about their underlying theory or related details and are capable of working on the specific models structure supported without restrictions. Their purpose is to utilize the pre-processed acquired data and to provide parametrized models.

In processing block 24 the model is selected from the group comprising a linear model, a non-linear model, a discrete time model, a continuous time model, a SISO model and a MIMO model.

In processing block 26 controller parameters and a controller design are determined from at least one of the modified data and the model. When multiple operating points are of interest, this is valid for all operating points. Based on the results of the previous model generation process, different techniques and algorithms already available may be applied. With respect to the technique and because of the automation process involved, those methods and algorithms are preferred which do not require extensive knowledge regarding their underlying theory or related details and are capable of working on the specific models and controllers supported without restrictions. Their purpose is to utilize the model's and, if required the modified data, and to provide the tuned controllers.

In processing block 28, the controller is applied to a system. The application may make use of the methods described above individually, partially combined or fully combined. Depending on the combination level, the steps and methods provide corresponding levels of automation. The application may constitute an algorithm, a software tool or package. By way of the above-described method, integrated model generation and controller tuning are provided.

The method further includes a level of synergy between the different steps to process information, which is not available in conventional mechanisms. Different information and criteria are checked and cross-checked at different stages of the process. In a particular embodiment of performing integrated model generation and controller tuning, user information and/or requirements are converted into criteria that are processed. The steps benefit from results of previous steps such that this information is not lost between steps and is taken into account as necessary.

In a particular example, the following information is checked and provided to the different steps throughout the present technique. The example involves vehicle dynamic models and a cruise control system for the vehicle. The information utilized throughout the various steps of the technique includes sampling information. The sampling information is found on measurements, for example, gas pedal position with respect to vehicle velocity can be measured. The sampling time $t_s$ in this case may be 20 milliseconds. This information is used for the modeling, for the control design, and for the control algorithm. The sampling time information impacts all steps of the technique and the tools used. The present technique provides this information to all steps and therefore is used to restrict dynamics in parameters of the model equations and controller algorithm. For example, for linear models there can be no eigenvalues smaller than approximately $80/t_s$. The benefit in such an automated procedure is that no modeling or controller errors or algorithm instabilities related to the sampling time, especially in the higher frequency range will occur.

Low-frequency dynamics are also measured and provided to the different steps throughout the present technique. An example of low frequency dynamics is the smallest frequency contained in the measured data (e.g., $f_{small}$=0.1 Hz). This information is also used for the modeling, for the control design, and for the control algorithm. The low and the high frequency dynamics may impact all steps of the technique and the tools used. The present technique provides this information to all steps and therefore this information is used to restrict dynamics and parameters of the model equations and controller algorithm. For example, for linear models there can be no relevant eigenvalues greater than approximately minus $2*pi*f_{small}/50$. The benefit in such an automated procedure is that there are no modeling controller errors or algorithm instabilities related to low frequency dynamics.

The noise levels are also measured and provided to the different steps throughout the present technique. Examples of noise levels may be deviations of 3 mph overlaid with the real speed values. This information is used in the model generation step. This is necessary to make sure the system dynamics are part of model and not the noise. The present technique considers the noise level as part of the decision criteria i.e., regarding which model is applicable. Automatic filtering can be provided if the noise level is found to be too high and required by the modeling tool. The recognition of outliers may also be utilized to fine tune the data. This results in improved model quality.

The existing knowledge about the system is also used and provided to the different steps throughout the present technique. The existing knowledge about the system is achieved by physical system analysis. The system that the measured data came from may be stable or unstable. The system knowledge may further include the number of inputs, the number of outputs, different levels of disturbances and integrating behavior. This information may be taken into account in the modeling step and in the control design and controller-tuning step. This simplifies the methodology and avoids unnecessary approximations. The present technique implements the existing knowledge into the strategy, for example, increasing gas pedal position by 10 percent results in a car velocity increase after some time and a car position increase all the time (this behavior is also known as 'integrating behavior'). Because cruise control requires speed information, modeling is used to provide a stable model. This results in improved model quality and models that are more realistic.

Time range information is also checked throughout the automated process and provided to the different steps throughout the present technique. Time range is a strategic factor in performing measurements. For example, when a car is traveling at a constant speed, then the gas pedal is pressed by an additional 10 percent, it may take approximately 15 seconds for the car to achieve a new constant speed (dependent upon the engine power). This information is taken into account during the model generation and is an important consideration when actual values of the model controller parameters are either extremely large or extremely small. This may be necessary to avoid extreme numbers which may not be handled well numerically. The present technique provides for scaling of the numbers such that the numbers can be processed without difficulties. In this example, time scaling is performed by dividing all time information by 15. This results in numbers which are neither too large nor too small, and reduces precision problems. This provides a degree of numerical independence with respect to time.

Amplitude range information is also checked throughout the process and provided to the different steps throughout the present technique. For example, assuming a car is traveling at a constant speed of 60 mph, then the gas pedal is pressed further. This will result in the car reaching a new constant speed. This information is taken into account during the model generation and is an important consideration when actual values of the model or controller parameters are either extremely large or extremely small. This may be necessary to avoid extreme numbers which may not be handled well numerically. The present technique provides for scaling of the numbers such that the numbers can be processed without difficulties. In this example, amplitude range scaling is performed by dividing all velocity information by 120. This results in numbers which are neither too large nor too small, and reduces precision problems. This provides a degree of numerical independence with respect to amplitude.

The dynamics covered include steady state and transition. These are found by making measurements and are provided to the different steps throughout the present technique. As an example, when a car is traveling for some period of time at a steady rate of 60 mph, then a transition may happen (such as for 50 seconds) then the car is traveling at 120 mph. This dynamic related information is utilized in the model generation process as it involves extracting information about operating points. This influences the correctness and the quality of the model generated from the measurements.

Particular embodiments of performing integrated model generation and controller tuning also factor into the process operating points of the system. These operating points may be measured or determined by an engineer. For example, car dynamics may be different depending on which gear the car is in or if the car is accelerating or decelerating. This is utilized to provide correct and realistic models and control design as well as the final tuning algorithm. This may be necessary as linear models for real systems are mostly valid in the vicinity of operating points only; non-linear models may cover a broader range. By way of the present technique, the models and controllers are generated automatically for the different operating points. In each case (i.e. the different gears and when the cars is accelerating or decelerating) models and corresponding controllers are calculated. The benefit of such a process is that models and controllers are optimized with respect to different operating points to provide improved accuracy, quality and predictability.

Another piece of information that is checked throughout the automated process is a dynamic range also referred to as the bandwidth. This information includes data relating to sampling time, low-frequency dynamics and time range. This information may be determined from the model, and is used for simulation and control design. This is done since only the dynamic range which is covered by the measurements may become part the model and/or the controller.

Otherwise, the results may be unpredictable. The present technique takes this into account and provides models and controllers which comply with all the requirements and limitation. The benefit from this is a degree of safety since the models and controllers cover the range which is covered by the measurements. No "virtual" information (which might be the result of the modeling controller tuning method used) becomes part of model or is contained in the final control parameters. This is important as using so-called virtual information could produce unforeseeable effects.

Defined control dynamics are also checked and provided throughout the process. These may be found in the control design and the controller parameter tuning. As an example, the cruise control must take into account accelerating from 40 mph to 55 mph in 4 seconds without overshoot. This is needed for acceptance because of the need to rely on the quality of the design in all relevant cases. The present technique iterates on different alternatives and presents the best result. As a result, high-quality product is produced.

Within an automated process the results from the different steps may be taken to feed data acquisition procedures and tools, analysis procedures and tools, simulation models, controllers, open and closed control loops, XiL (wherein X is a placeholder for any environment including HiL (Hardware-in-the-Loop), SiL (Software-in-the-Loop) and MiL (Man-in-the-Loop)) environments, industrial and embedded systems, electronic control units, microprocessor and microcontroller based environments and test cell automation systems.

In general, the existing methods may be distinguished with respect to the prerequisites involved and different application criteria. They include applicability for linear or non-linear systems, discrete time or continuous-time models, Single Input/Single Output (SISO) systems up to Multiple Input/Multiple Output (MIMO) systems, and excitation signals including different types of noise, steps, ramps, pulses, and combinations thereof.

As already indicated, the modified data is fed into the methods or algorithms and they are used to provide the desired model structure and parametrization. Depending on the single method or the combination of methods used, the structure may be found automatically by a technique or by iteration.

As the bandwidth of the acquired data is reflected in the models, these limitations impact the models' applicability within simulation models, closed control loop structures in non-real-time or real-time applications. The bandwidth of the acquired data is also taken into account in the corresponding applications, as ignoring this may result in unpredictable results.

To cover different operating points for the systems under investigation, this procedure may be carried out in an iterative process in order to acquire controller parameter sets optimized for the different operating points. Different system descriptions and different controller structures may be used. Overall, descriptions and variants in between are also possible. The technique is applicable in all industry sectors for all systems where data acquisition, modeling, simulation, control engineering and controller tuning are involved, either in offline (e.g., non-real-time) or real-time applications.

Analyzing the measured data extensively prior to starting (and also in parallel to the model generation or controller parametrization process if necessary) is helpful for applying this procedure successfully. Model generation allows the test of different model structures and depending on quality measures, the model and the parameters found to be best are used for the controller parameter calculation. The controller tuning process is carried out, also iteratively when needed, to achieve desired closed control loop dynamics. For the overall process, it is considered ideal when only a minimum of properties is required to be pre-defined for the measured data, the model and the closed control loop. As a consequence, the technique makes it easy to tune controllers based on measurements without the need to have expert knowledge in the underlying disciplines.

Figure 2:
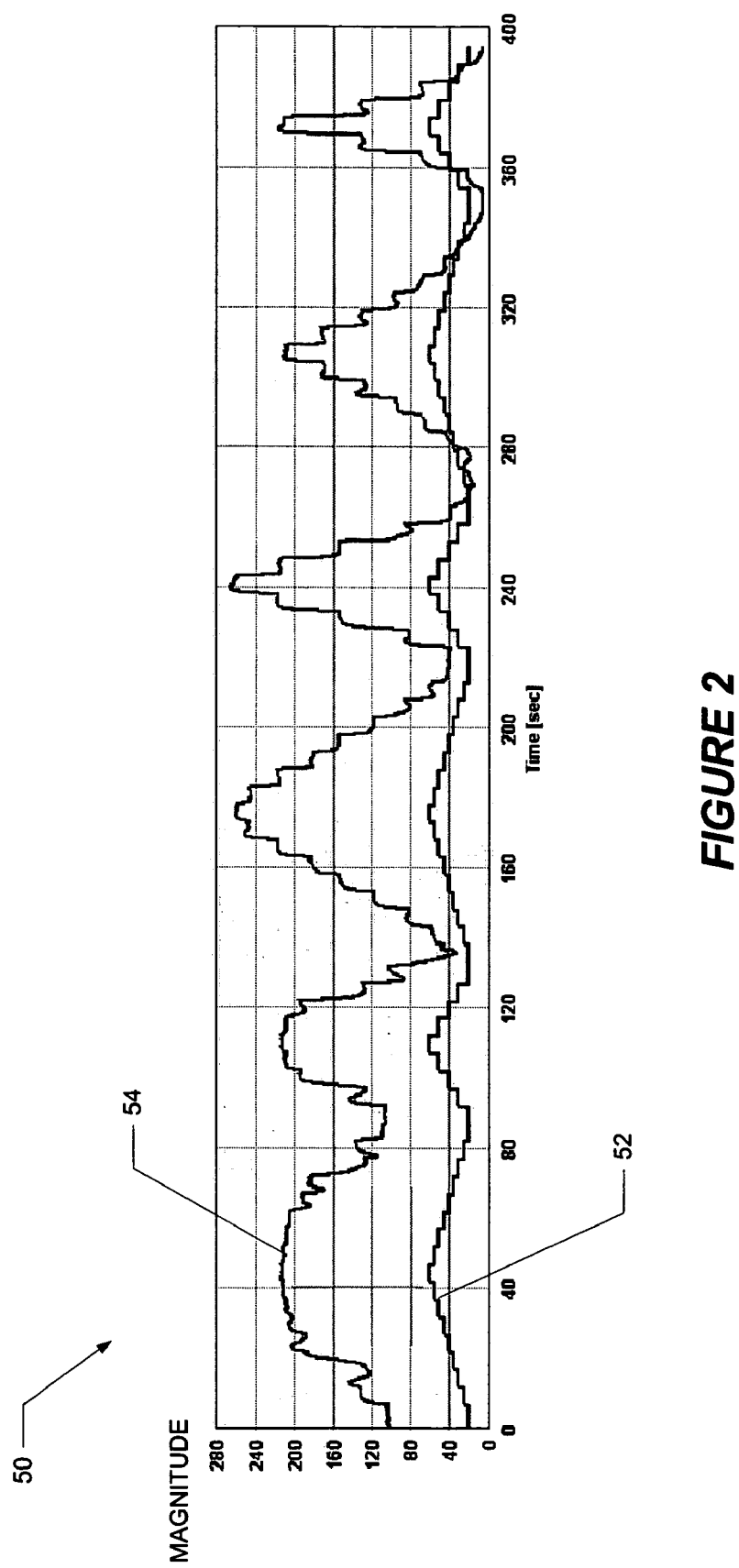
FIG. 2 is a graph showing a system input and output used for performing automated model generation and controller tuning process in accordance with aspects of the invention.

Referring now to FIG. 2, a sample data acquisition is shown. In this example, the data is in the form of a graph 50. The graph 50 has a horizontal axis showing time and a vertical axis showing magnitude. The graph 50 includes an input waveform 52 and an output waveform 54. Given this set of data points, the method of performing integrated model generation and controller tuning analyzes the data, processes the data and develops a mathematical set of equations describing the relationship between the output signal 54 and the input signal 52. A model is generated from the data. A controller and controller parameters are derived from the model and data, resulting in a controller that provides behavior in accordance with the provided data.

The graph 50 represents a particular embodiment the data that is acquired and will be analyzed and preprocessed to determine the modified data. The graph 50 may be the result of data measurements from a similar type system, may be the result of a data simulation or may be the result of a data calculation. The resulting controller and tuning parameters achieved by way of the present method of performing integrated model generation and controller tuning will receive data corresponding to the input waveform 52 of the graph 50 and provide an output of the system which corresponds to output waveform 54.

Figure 3:
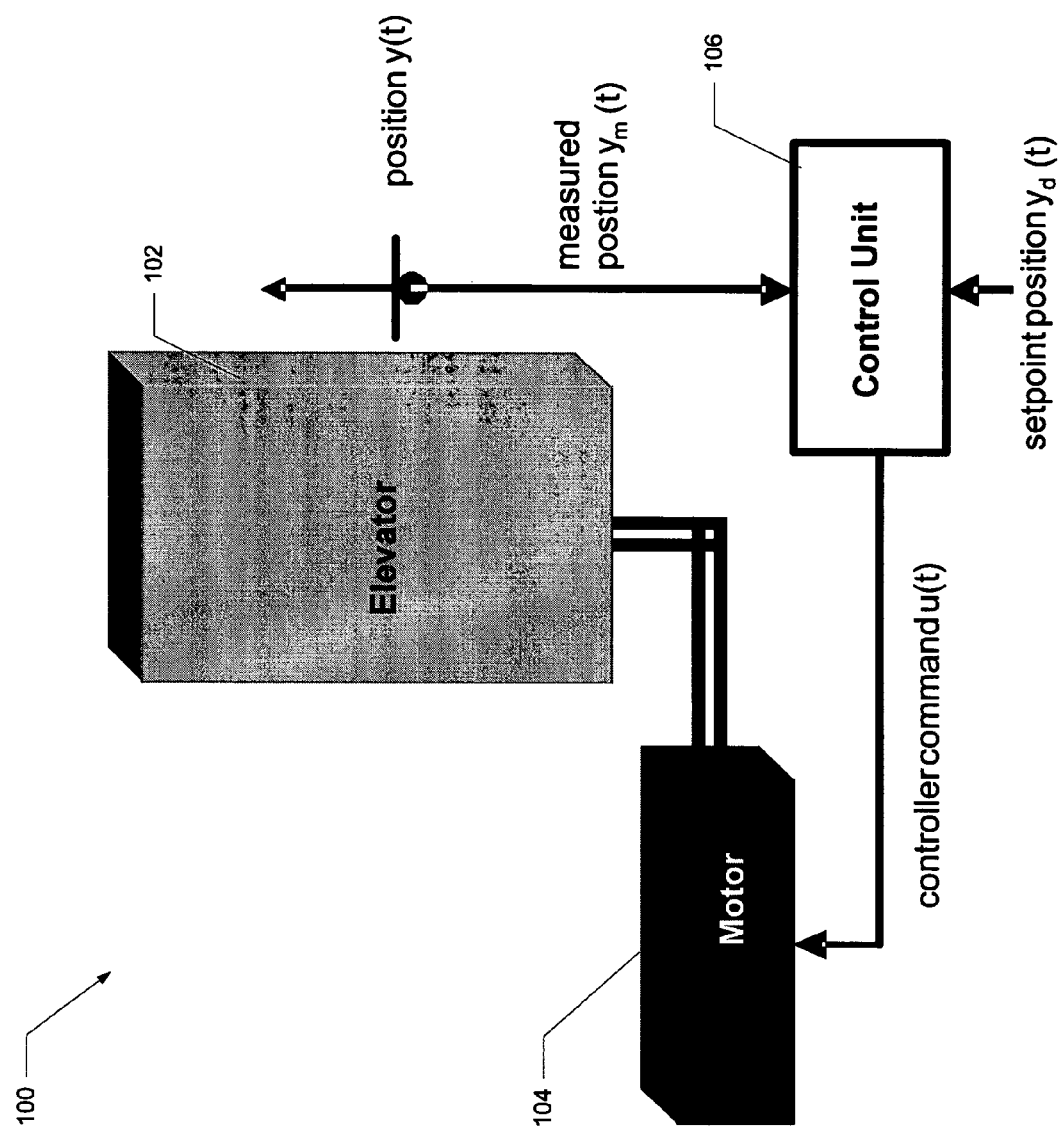
FIG. 3 is a block diagram of a system implemented by use of the automated model generation and controller tuning process.

Referring now to FIG. 3, an example system 100 utilizing a control unit produced by way of an embodiment of the present method of performing integrated model generation and controller tuning is shown. This particular example involves the use of an elevator 102 and control unit 106 for a motor 104 used to position the elevator 102. The derived control unit 106 in this example receives a setpoint position $y_d(t)$ and a measured position $y_m(t)$ and determines signals to send to the motor 104 such that the elevator 102 is positioned at a desired position y(t).

In this example, data regarding the elevator system was acquired. The data was preprocessed and analyzed and a model of the elevator system was generated from this data. The control unit 106 was derived from the model and the preprocessed data. In this example, the control unit 106 was derived such that the control unit 106 receives as inputs the setpoint position $y_d(t)$ and the measured position $y_m(t)$ and determines appropriate output control signals to send to the motor 104 such that the elevator 102 is positioned at a desired position y(t) in accordance with the desired operation of the elevator system.

Figure 4:
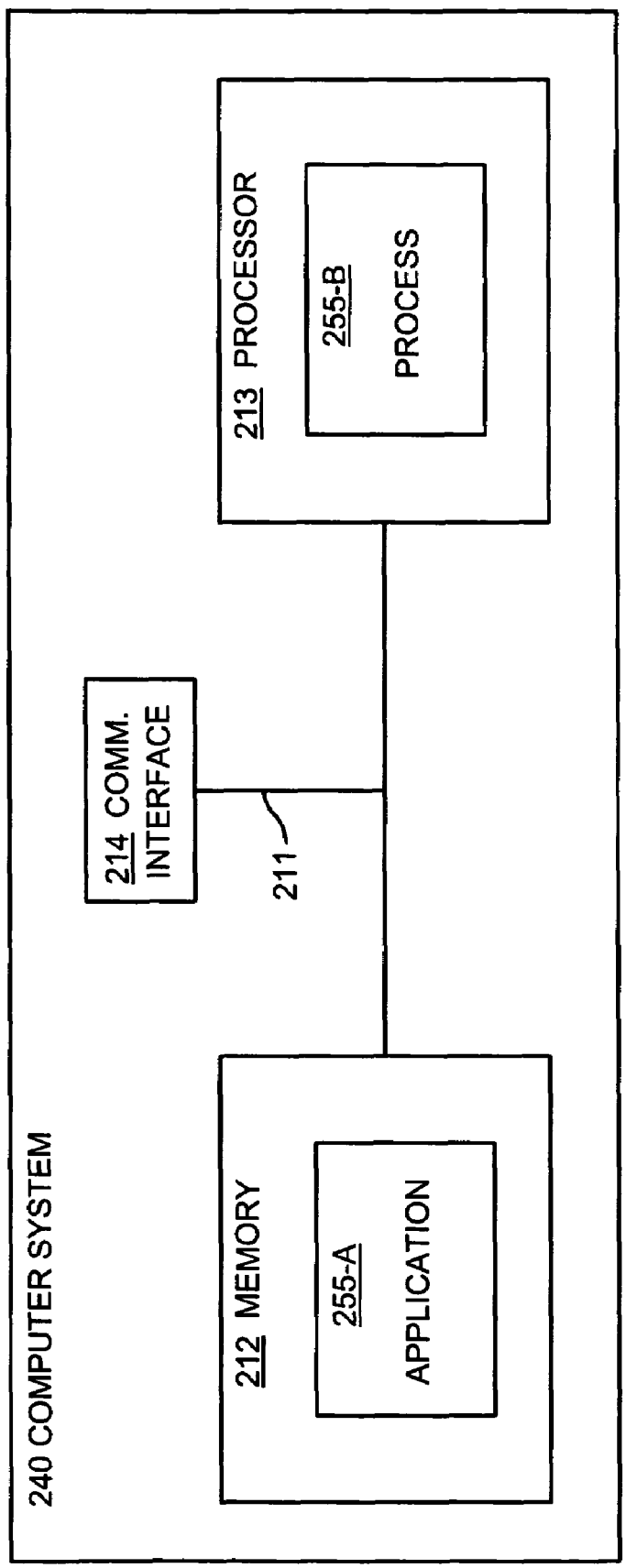
FIG. 4 illustrates an example computer system architecture for a computer system that performs integrated model generation and controller tuning in accordance with embodiments of the invention.

FIG. 4 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system. It is to be understood that the agent 255 operate as explained in former examples are represented in FIG. 5 by the agent application 255-A and/or the process 255-B.

In general, making use of this automation process should require natural and intuitive definitions only. The number of definitions should be as small as possible to make the complex technical methods involved here accessible and applicable even to non-experts in the different application domains. Another important aspect in the automation described here is that using the technique inside an application, natural and as few as possible definitions are required only. This requirement yields complex technical methods getting applicable even by non-experts and in industrial environments.

There are several differences between embodiments of the present method of performing integrated model generation and controller tuning and conventional mechanisms used to provide a similar type process. For example, the step of measuring is performed in conventional systems using existing data acquisition tools. The present method of performing integrated model generation and controller tuning utilizes stored data and provides automatic format recognition.

The step of processing data includes data such as sampling time, low-frequency dynamics, noise, outliers, existing knowledge, time range, amplitude range, steady-state and transitions, operating points, dynamic range and bandwidth, and defined control dynamics. Conventional systems utilize computer-based analysis with respect to certain of the above-mentioned items. The present method of performing integrated model generation and controller tuning may perform algorithmic analysis with flexible and extended criteria, incorporates the extraction of measurements taking existing knowledge into account regarding different operating points, validating model bandwidth with respect to measurement bandwidth; performs time scaling and amplitude scaling. A larger amount of data is taken into account. The benefit of present method of performing integrated model generation and controller tuning over conventional systems is that multiple predefined criteria make the decisions automatically. Prerequisites which are required explicitly or inherently by model generation tools are automatically fulfilled. Additionally linearity checks are provided as needed. In certain instances, a result of this checking may be that only a non-linear model is capable to describe the reality at sufficient quality. As a result, criteria are provided that are applicable in industrial environments rather than purely theoretical or mathematical environments.

In conventional systems the modeling may be performed by existing software tools to provide discrete time models or continuous time models. The present method of performing integrated model generation and controller tuning applies existing models and tools and integrates them into the entire process thus allowing a selection of the optimal model generation technique for models available and to switch between model generation techniques. This results in optimal and realistic models taking into account all the information available for the previous steps. As a result, expert knowledge is not required because the process is automated.

In some systems, the step of generating the controller and tuning parameters in conventional systems is done by computer-based control design and parameterization techniques operated primarily by experts. The present method of performing integrated model generation and controller tuning applies existing method and tools and integrates them into the entire process, thereby allowing a selection of the optimal model generation technique from those available and to switch between model generation techniques. As a result, optimized controllers are found taking into account all information available from previous steps.

In conventional systems, the step of testing the system is performed by checking if the requirements are achieved in a test environment. In certain embodiments of the present method of performing integrated model generation and controller tuning the test results match the design results since data such as sampling information, low frequency dynamics, noise levels, system knowledge, time range, amplitude range, steady state dynamics, transition dynamics, operating points, and bandwidth are taken into account throughout the process.

In general, the process should utilize relative criteria rather than absolute in order for the process to be more applicable to other environments. The presently described process also supports numerical and application independence. By way of the present method of performing integrated model generation and controller tuning, the overall development cycle can be reduced from days or weeks to seconds or minutes, resulting in a concomitant savings of labor and reduced cost It is to be understood that embodiments of the method of performing integrated model generation and controller tuning include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the method of performing integrated model generation and controller tuning can provide the applications operating within the processor 213 as the processes. While not shown in this example, those skilled in the art will understand that the computer system may include other processes and/or software and hardware components, such as an operating system, which have been left out of this illustration for ease of description of the method of performing integrated model generation and controller tuning.

Having described preferred embodiments of the invention it will now become apparent to those of ordinary skill in the art that other embodiments incorporating these concepts may be used. Additionally, the software included as part of the method of performing integrated model generation and controller tuning may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the method of performing integrated model generation and controller tuning should not be limited to the described embodiments but rather should be limited only by the spirit and scope of the appended claims.

What is claimed is:

1. A method of performing integrated model generation and controller tuning comprising:
   acquiring data of physical quantities over time from a system, said acquired data including at least one of the group comprising sampling information, low frequency dynamics, noise levels, system knowledge, time range, amplitude range, steady state dynamics, transition dynamics, operating points, defined control dynamics, and bandwidth;
   analyzing and preprocessing said acquired data to determine modified data;
   generating a model from said modified data, said model being a time-domain model and including effects from at least one of the group comprising sampling information, low frequency dynamics, noise levels, system knowledge, time range, amplitude range, steady state dynamics, transition dynamics, operating points, defined control dynamics, and bandwidth;
   determining a controller design from at least one of said modified data and said model, said controller design including effects from at least one of the group comprising sampling information, low frequency dynamics, noise levels, system knowledge, time range, amplitude range, steady state dynamics, transition dynamics, operating points, defined control dynamics, and bandwidth; and
   calculating controller parameters from at least one of said modified data and said model, the calculated controller parameters being used to control the system.

2. The method of claim 1 further comprising applying said controller design and said controller parameters to said system.

3. The method of claim 1 wherein said acquiring data comprises acquiring data from at least one of data measurements, data simulations and data calculations.

4. The method of claim 1 wherein said preprocessing said acquired data includes scaling said acquired data.

5. The method of claim 1 wherein said analyzing said acquired data comprises analyzing said acquired data using relative measures.

6. The method of claim 5, wherein said analyzing said acquired data using said relative values comprises obtaining the relative values by dividing absolute acquired values by a respective mean value of the absolute acquired values.

7. The method of claim 1 wherein said generating a model comprises generating a model selected from at least one of the group comprising a linear model, a non-linear model, a discrete time model, a continuous time model, a Single Input/Single Output (SISO) model and a Multiple Input/Multiple Output (MIMO) model.

8. A computer readable medium having computer program logic encoded thereon that when performed in a computerized device causes the computerized device to perform associated operations for providing integrated model generation and controller tuning, the operations including:
   acquiring data of physical quantities over time from a system;
   analyzing and preprocessing said acquired data to determine modified data;
   generating a model from said modified data, said model being a time-domain model and including effects from at least one of the group comprising sampling information, low frequency dynamics, noise levels, system knowledge, time range, amplitude range, steady state dynamics, transition dynamics, operating points, defined control dynamics, and bandwidth;
   determining a controller design from at least one of said modified data and said model, said controller design including effects from at least one of the group comprising sampling information, low frequency dynamics, noise levels, system knowledge, time range, amplitude range, steady state dynamics, transition dynamics, operating points, defined control dynamics, and bandwidth; and
   calculating controller parameters from at least one of said modified data and said model, the calculated controller parameters being used to control the system.

9. The computer readable medium of claim 8 wherein said operations further include applying said controller design and said controller parameters to said system.

10. The computer readable medium of claim 8 wherein acquiring data comprises acquiring data from at least one of data measurements, data simulations and data calculations.

11. The computer readable medium of claim 8 wherein preprocessing said acquired data includes instructions for scaling said acquired data.

12. The computer readable medium of claim 8 wherein analyzing said acquired data comprises analyzing said acquired data using relative measures.

13. The computer readable medium of claim 8 wherein generating a model comprises generating a model selected from at least one of the group comprising a linear model, a non-linear model, a discrete time model, a continuous time model, a Single Input/Single Output (SISO) model and a Multiple Input/Multiple Output (MIMO) model.

14. A computer system comprising:
   a memory;
   a processor;
   a communications interface;
   an interconnection mechanism coupling the memory, the processor and the communications interface; and
   wherein the memory is encoded with an application that when performed on the processor, provides an integrated model generation and controller tuning process for processing information, the process causing the computer system to perform the operations of:
   acquiring data of physical quantities over time from a system;
   analyzing and preprocessing said acquired data to determine modified data;
   generating a model from said modified data, said model being a time-domain model and including effects from at least one of the group comprising sampling information, low frequency dynamics, noise levels, system knowledge, time range, amplitude range, steady state dynamics, transition dynamics, operating points, defined control dynamics, and bandwidth;
   determining a controller design from at least one of said modified data and said model, said controller design including effects from at least one of the group comprising sampling information, low frequency dynamics, noise levels, system knowledge, time range, amplitude range, steady state dynamics, transition dynamics, operating points, defined control dynamics, and bandwidth; and calculating controller parameters from at least one of said modified data and said model, the calculated controller parameters being used to control the system.

15. The computer system of claim 14 further comprising applying said controller design and said controller parameters to said system.

16. The computer system of claim 14 wherein said acquiring data comprises acquiring data from at least one of data measurements, data simulations and data calculations.

17. The computer system of claim 14 wherein said preprocessing said acquired data includes scaling said acquired data.

18. The computer system of claim 14 wherein said analyzing said acquired data comprises analyzing said acquired data using relative measures.

19. The computer system of claim 14 wherein said generating a model comprises generating a model selected from at least one of the group comprising a linear model, a non-linear model, a discrete time model, a continuous time model, a Single Input/Single Output (SISO) model and a Multiple Input/Multiple Output (MIMO) model.

20. A method of performing integrated model generation and controller tuning comprising:

acquiring data of physical quantities over time from a system, the data being acquired from at least one of data measurements, data simulations and data calculations, said acquired data including at least one of the group comprising sampling information, low frequency dynamics, noise levels, system knowledge, time range, amplitude range, steady state dynamics, transition dynamics, operating points, defined control dynamics, and bandwidth;

analyzing and preprocessing said acquired data to determine modified data wherein said analyzing is performed using relative measures and wherein said preprocessing includes scaling said acquired data;

generating a model from said modified data, said model being a time-domain model and including effects from at least one of the group comprising sampling information, low frequency dynamics, noise levels, system knowledge, time range, amplitude range, steady state dynamics, transition dynamics, operating points, defined control dynamics, and bandwidth, and wherein said model is selected from at least one of the group comprising a linear model, a non-linear model, a discrete time model, a continuous time model, a Single Input/Single Output (SISO) model and a Multiple Input/Multiple Output (MIMO) model;

determining a controller design from at least one of said modified data and said model, said controller design including effects from at least one of the group comprising sampling information, low frequency dynamics, noise levels, system knowledge, time range, amplitude range, steady state dynamics, transition dynamics, operating points, defined control dynamics, and bandwidth;

calculating controller parameters from at least one of said modified data and said model; and applying said controller design and said controller parameters to said system, the calculated controller parameters being used to control the system.

21. A method of performing integrated model generation and controller tuning comprising:

acquiring data of physical quantities over time from a system, said acquired data including at least one of the group comprising sampling information, low frequency dynamics, noise levels, system knowledge, time range, amplitude range, steady state dynamics, transition dynamics, operating points, defined control dynamics, and bandwidth;

analyzing and preprocessing said acquired data to determine modified data;

generating a model from said modified data, said model including effects from at least one of the group comprising sampling information, low frequency dynamics, noise levels, system knowledge, time range, amplitude range, steady state dynamics, transition dynamics, operating points, defined control dynamics, and bandwidth;

determining a controller design from at least one of said modified data and said model, said controller design including effects from at least one of the group comprising sampling information, low frequency dynamics, noise levels, system knowledge, time range, amplitude range, steady state dynamics, transition dynamics, operating points, defined control dynamics, and bandwidth; and calculating controller parameters from at least one of said modified data and said model, the calculated controller parameters being used to control the system, wherein said preprocessing said acquired data includes scaling said acquired data, and wherein said scaling said acquired data comprises amplitude scaling and time scaling to obtain numerical independence during processing.

22. The method of claim 21, wherein:

(1) said time scaling comprises (a) checking time range information during the step of acquiring said acquired data; and (b) dividing time information by an appropriate fixed time value based on the time range information; and (2) said amplitude scaling comprises (a) checking amplitude range information during the step of acquiring said acquired data; and (b) dividing amplitude information by an appropriate fixed amplitude value based on the amplitude range information.

* * * * *